(12) United States Patent
Yin et al.

(10) Patent No.: US 11,170,311 B2
(45) Date of Patent: Nov. 9, 2021

(54) SYSTEM AND METHOD FOR DETERMINING EXPENSE INFORMATION BASED ON INFERRED EVENTS

(71) Applicant: Coupa Software Incorporated, San Mateo, CA (US)

(72) Inventors: Christopher Yin, Redwood City, CA (US); Jeffrey Hellman, Albuquerque, NM (US); Scott Harris, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 1152 days.

(21) Appl. No.: 15/160,954

(22) Filed: May 20, 2016

(65) Prior Publication Data

US 2017/0337480 A1 Nov. 23, 2017

(51) Int. Cl.
*G06N 7/02* (2006.01)
*G06N 5/04* (2006.01)
(Continued)

(52) U.S. Cl.
CPC ........... *G06N 5/048* (2013.01); *G06F 16/951* (2019.01); *H04L 67/18* (2013.01); *H04L 67/22* (2013.01);
(Continued)

(58) Field of Classification Search
CPC ......... G06Q 40/12; G06N 5/048; H04L 67/22
(Continued)

(56) References Cited

U.S. PATENT DOCUMENTS 6,795,017 B1 * 9/2004 Puranik ................. G01S 5/0027
342/357.77
6,826,473 B1 * 11/2004 Burch ..................... G01C 21/20
342/357.46
(Continued)

OTHER PUBLICATIONS

MileIQ "Drive Detection", May 2015, retrieved from: https://web.archive.org/web/20150504010925/http://support.mileiq.com/knowledgebase/topics/60121-drive-detection.*
(Continued)

*Primary Examiner* — Jue Louie
(74) *Attorney, Agent, or Firm* — Baker Botts, L.L.P.

(57) ABSTRACT

Techniques and a system are provided for generating correlations based on inferred behavior by an inferred event detection system executing on a mobile computing device. Inferred events are events that are detected without an explicit input to the mobile computing device. The inferred events are further classified by the inferred event detection system. In one embodiment, a method comprises, using an application on a mobile computing device, wherein the mobile computing device includes at least one geolocation antenna capable of providing geolocation information that is accessible by the application and that specifies a geolocation of the mobile computing device at a particular time, monitoring the geolocation information; without receiving an explicit request to the application executing on the mobile computing device, determining by the mobile computing device at a first time, a first timestamp and a first geolocation information for the mobile computing device at the first time; without receiving an explicit request to the application executing on the mobile computing device, determining by the mobile computing device at a second time, a second timestamp and a second geolocation information for the mobile computing device at the second time; determining, based on a difference between at least one of the first
(Continued)

timestamp and the second timestamp, or the first geolocation information and the second geolocation information, that a first event of a first monitored event class has occurred between the first time and the second time; generating, based on the first monitored event class and in response to determining the first event has occurred after the second time, a first alert on the mobile computing device, wherein the first alert comprises a prompt for additional information to be associated with the first event; causing to be stored at a computer system, information about the first event including the first monitored event class and any additional information associated with the first event that is received in response to the first alert.

16 Claims, 9 Drawing Sheets

(51) Int. Cl.
　　*H04L 29/08*　　　(2006.01)
　　*G06F 16/951*　　(2019.01)
　　*H04W 4/029*　　 (2018.01)
　　*H04W 4/02*　　　(2018.01)
　　*G06N 20/00*　　 (2019.01)

(52) U.S. Cl.
　　CPC ............ *H04W 4/029* (2018.02); *G06N 20/00* (2019.01); *H04L 67/26* (2013.01); *H04W 4/023* (2013.01)

(58) Field of Classification Search
　　USPC .......................................... 706/1–62; 705/30
　　See application file for complete search history.

(56) References Cited

U.S. PATENT DOCUMENTS

| | | | | |
|---|---|---|---|---|
| 7,908,191 B1* | 3/2011 | Dinamani | .............. | G01C 22/02 340/988 |
| 8,554,647 B1* | 10/2013 | Grigg | ................ | G06Q 30/0639 701/469 |
| 8,949,462 B1* | 2/2015 | Djabarov | ............ | H04L 63/0421 709/246 |
| 9,196,148 B1* | 11/2015 | Hutz | ...................... | G08B 21/18 |
| 9,292,982 B1* | 3/2016 | Higgs | .................... | G06Q 40/12 |
| 9,953,366 B1* | 4/2018 | Rogers | ................... | G06Q 40/00 |
| 2012/0130630 A1* | 5/2012 | Tang | .................. | G01C 21/3415 701/413 |
| 2012/0259748 A1* | 10/2012 | Young | .................... | G06Q 40/02 705/34 |
| 2012/0290609 A1* | 11/2012 | Britt | ...................... | G06F 16/951 707/769 |
| 2013/0007665 A1* | 1/2013 | Chaudhri | ................ | H04L 51/24 715/830 |
| 2013/0024471 A1* | 1/2013 | Mitrovic | ............. | G06F 16/9535 707/769 |
| 2013/0085908 A1* | 4/2013 | Singh | ..................... | G06Q 10/06 705/30 |
| 2013/0325399 A1* | 12/2013 | Yuen | ..................... | H04W 4/029 702/178 |
| 2014/0258838 A1* | 9/2014 | Evers | .................... | G06F 17/243 715/234 |
| 2014/0298268 A1* | 10/2014 | Kang | .................. | G06F 3/04847 715/841 |
| 2014/0368333 A1* | 12/2014 | Touloumtzis | ........... | H04L 67/24 340/505 |
| 2015/0019409 A1* | 1/2015 | Vagiri | ................ | G06Q 20/3221 705/39 |
| 2015/0033361 A1* | 1/2015 | Choi | ...................... | G06F 21/316 726/27 |
| 2015/0065161 A1* | 3/2015 | Ganesh | ................. | H04W 4/021 455/456.1 |
| 2015/0127253 A1* | 5/2015 | Hurtado | ............... | G07C 5/0858 701/527 |
| 2015/0262153 A1* | 9/2015 | Kikunaga | .............. | G06Q 30/04 705/40 |
| 2015/0350147 A1* | 12/2015 | Shepherd | ................ | H04L 51/22 715/752 |
| 2016/0019465 A1* | 1/2016 | Milton | .................. | H04W 4/029 706/52 |
| 2016/0035042 A1* | 2/2016 | Bomze | .............. | G01C 21/3697 705/30 |
| 2016/0037481 A1* | 2/2016 | Won | ........................ | G06Q 50/01 715/771 |
| 2016/0066155 A1* | 3/2016 | Fan | ........................ | G06F 3/0484 455/457 |
| 2016/0226985 A1* | 8/2016 | Yoon | .................... | H04L 67/2861 |
| 2016/0253702 A1* | 9/2016 | Gonzales, Jr. | ..... | G06Q 30/0249 705/14.48 |
| 2016/0321659 A1* | 11/2016 | Annesley-DeWinter | .................... | G06Q 40/12 |
| 2017/0093998 A1* | 3/2017 | McKay | .................... | H04L 67/26 |
| 2017/0103589 A1* | 4/2017 | Makke | .................. | B60K 35/00 |
| 2017/0116679 A1* | 4/2017 | Abraham | ............... | G06Q 40/12 |

OTHER PUBLICATIONS

TripLog GPS Mileage Tracker User Guide, May 2012, retrieved from: https://www.opieaccounting.com/images/TripLogUserGuide.pdf.*

TripLog User Guide, excerpt, Mar. 2015, retrieved from: https://web.archive.org/web/20150318053302/https://triplogmileage.com/userguide.html.*

* cited by examiner

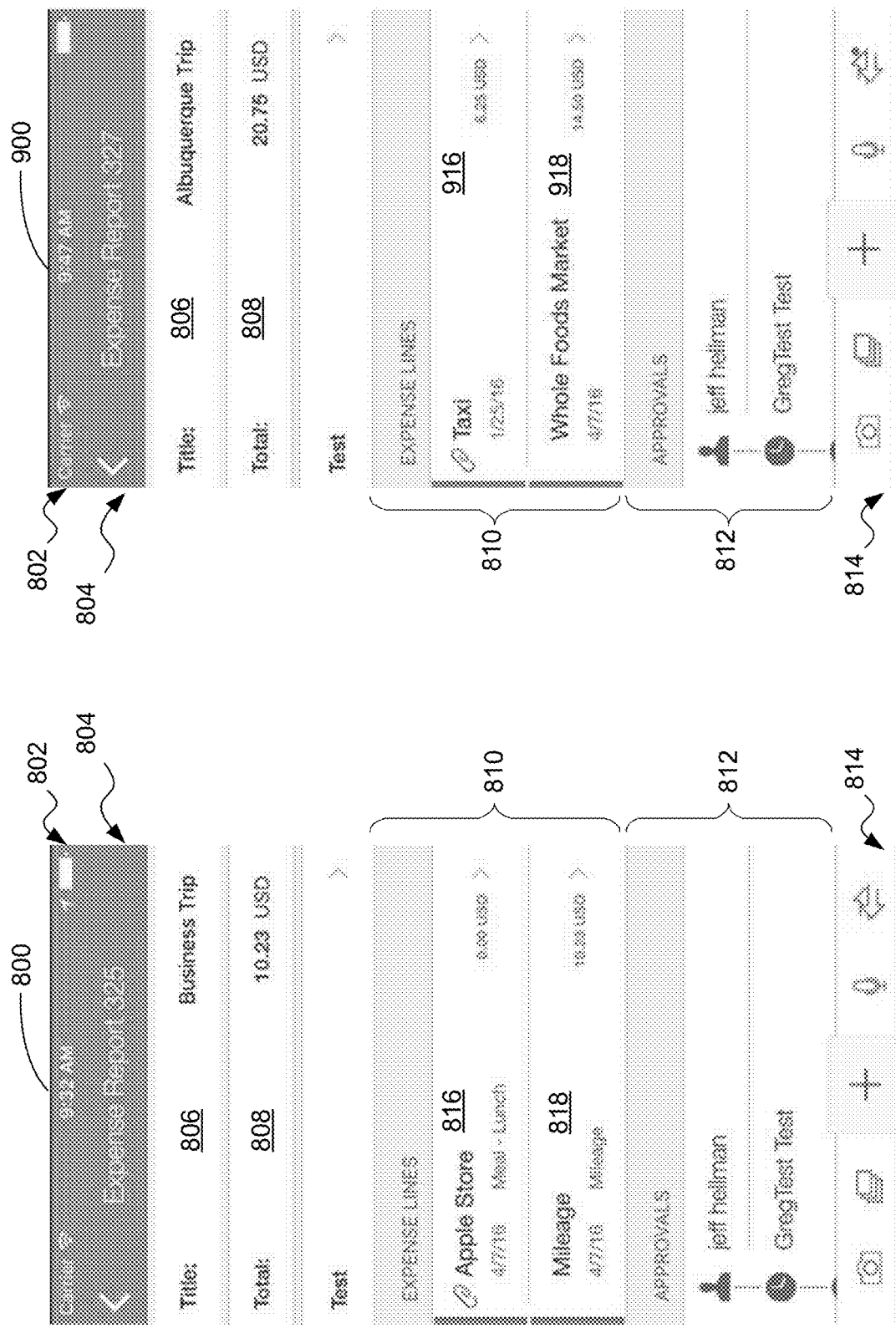

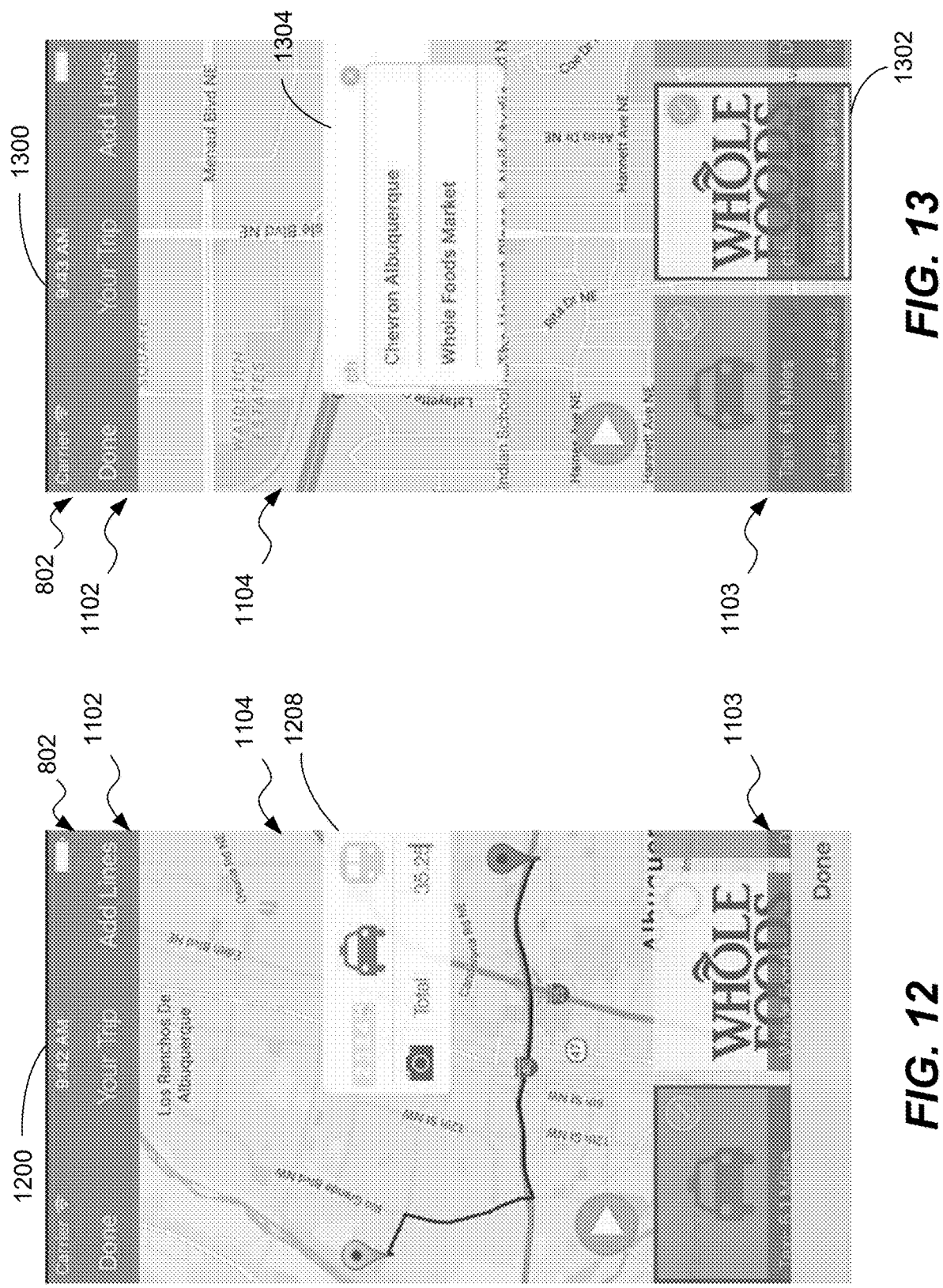

SYSTEM AND METHOD FOR DETERMINING EXPENSE INFORMATION BASED ON INFERRED EVENTS

TECHNICAL FIELD

The present disclosure generally relates to the use of mobile computing devices to infer programmed actions to perform based on the occurrence of identified events. Specifically, the present disclosure relates to using specific digital data matching techniques to infer whether a programmatic event has occurred. SUGGESTED GROUP ART UNIT: 2129; SUGGESTED CLASSIFICATION: 706/48.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business entities sometimes request or require employees to incur expenses for travel expenses, supplies, or dining in connection with actions taken in the course of employment. These costs are typically paid by an employee and recorded in an expense report, which is provided to a manager or other entity in the company for review and payment as a form of reimbursement. Computer-based expense tracking systems have come in to use, but at present, they rely on techniques that make it difficult for employees to report expenses and receive reimbursement. Some companies use a paper based system, electronic spreadsheet, or a web based system. Regardless of the system, employees have the burden to file an expense report detailing what events qualifying for expense reporting and reimbursement occurred, how much they spent on these events, and various associated details, such as a reason for the expense, amount paid, the merchant, and other details.

Typically individuals mentally remember what qualifying events occur during a trip from receipts they collect after each qualifying event. A receipt indicates how much was spent and where it was spent. For example, employees might have a collection of receipts from stores, restaurants, and taxis for each business trip. This results in a backlog of expense events to be recorded. Further, many employees find entering expense events to be a laborious process, so they postpone entering expenses until the last possible minute, such as the end of a month. By then, the employees may need extensive investigation to determine details they have forgotten or receipts they have misplaced and, when expense reports are done in haste, result in many missing details. Further, delaying the expense report often violates company policies, which require expense reports within a certain period of time from the business trip (for compliance and accounting reasons).

SUMMARY

The appended claims may serve to summarize the present disclosure.

BRIEF DESCRIPTION OF THE DRAWINGS

In the drawings:

FIG. 8 shows, in an embodiment, the inferred event detection system programmed to display a screen on a mobile computing device for an expense report.

FIG. 9 shows, in an embodiment, the inferred event detection system programmed to display a screen on a mobile computing device for another expense report.

FIG. 12 shows, in an embodiment, the inferred event detection system programmed to display a screen on a mobile computing device for editing an inferred event in a wrap up view for an expense report.

FIG. 13 shows, in an embodiment, the inferred event detection system programmed to display a screen on a mobile computing device for editing another inferred event in a wrap up view for an expense report.

DETAILED DESCRIPTION

Figure 1:
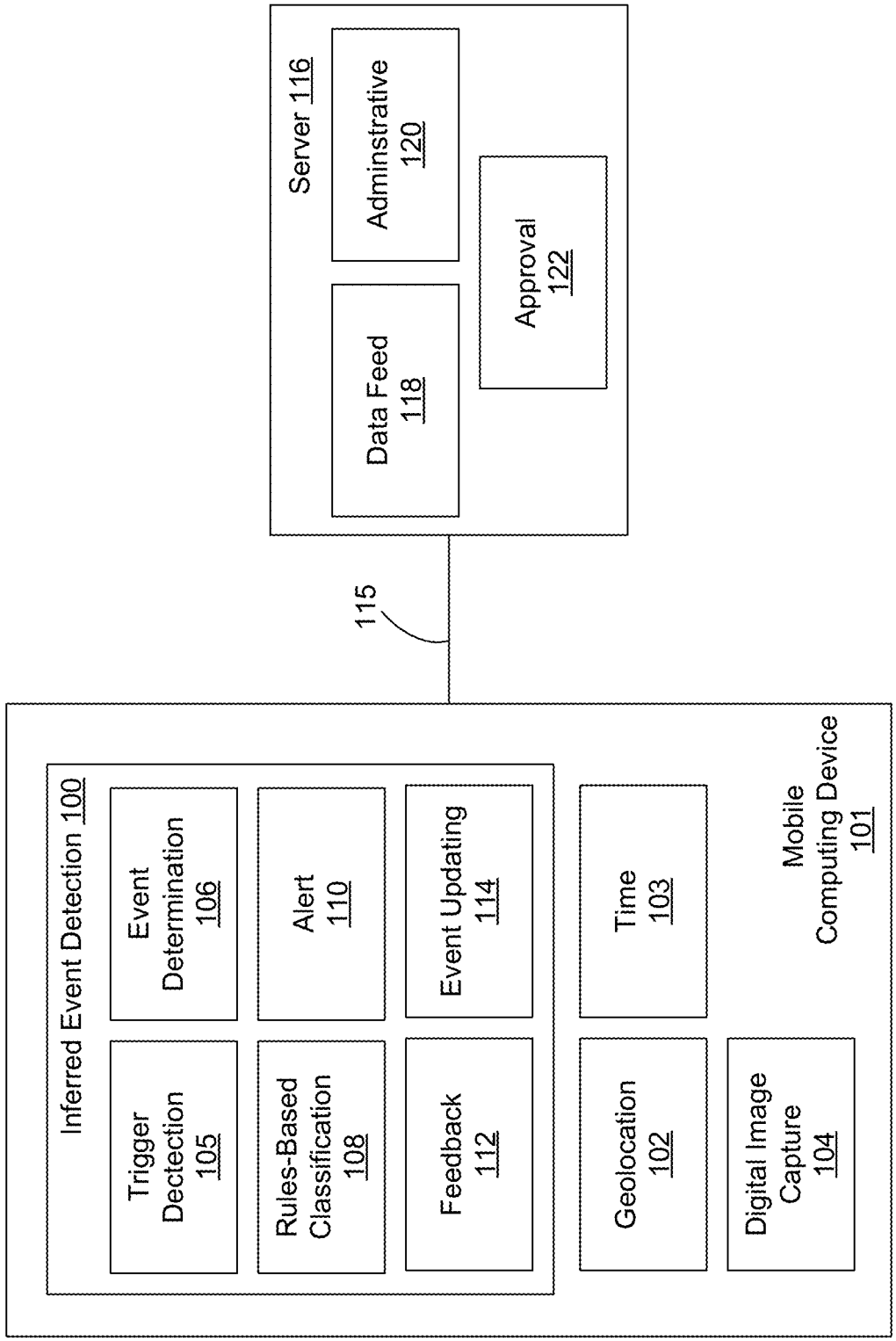
FIG. 1 illustrates an example system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Certain embodiments are described in the content of an application executing on a mobile computing device that works with a server computer. However, it is understood that an application is only executing code which may occur solely or partially on the mobile computing device. For example, the same principles as discussed in this application would be possible using a standalone computer, without access to a server computer.

Embodiments are described herein according to the following outline:
1.0 GENERAL OVERVIEW
2.0 STRUCTURAL OVERVIEW
3.0 EXAMPLE EMBODIMENT OF GENERATING INFERRED EVENTS
  3.1 PROCESSING WITHOUT RECEIVING AN EXPLICIT REQUEST
  3.2 MONITORING FOR INFERRED EVENTS
  3.3 CLASSIFICATION FOR INFERRED EVENTS
  3.4 GENERATING AN ALERT
4.0 EXAMPLE EMBODIMENT OF AN INFERRED EVENTS SUMMARY
  4.1 DISPLAYING A WRAP UP VIEW
  4.2 UPDATES IN THE WRAP UP VIEW
5.0 EXAMPLE IMPLEMENTATION OF AN INFERRED EVENT DETECTION SYSTEM WITH ALERTS USING A GRAPHICAL USER INTERFACE
6.0 EXAMPLE IMPLEMENTATION OF AN INFERRED EVENT DETECTION SYSTEM MODIFYING INFERRED EVENTS USING A GRAPHICAL USER INTERFACE
7.0 EXAMPLE IMPLEMENTATION OF AN INFERRED EVENT DETECTION SYSTEM IN A WRAP UP VIEW USING A GRAPHICAL USER INTERFACE
8.0 ADDITIONAL FEATURES OF THE INFERRED EVENT DETECTION SYSTEM
  8.1 MISSING TIME ENTRY
  8.2 MACHINE LEARNING
  8.3 BLACKLIST
  8.4 PRIVACY
9.0 HARDWARE OVERVIEW 1.0 General Overview Techniques and a system are provided for generating correlations based on inferred behavior by an inferred event detection system executing on a mobile computing device. Inferred events are events that are detected without an explicit input to the mobile computing device. The inferred events are further classified by the inferred event detection system.

In one embodiment, a method comprises, using an application on a mobile computing device, wherein the mobile computing device includes at least one geolocation antenna capable of providing geolocation information that is accessible by the application and that specifies a geolocation of the mobile computing device at a particular time, monitoring the geolocation information; without receiving an explicit request to the application executing on the mobile computing device, determining by the mobile computing device at a first time, a first timestamp and a first geolocation information for the mobile computing device at the first time; without receiving an explicit request to the application executing on the mobile computing device, determining by the mobile computing device at a second time, a second timestamp and a second geolocation information for the mobile computing device at the second time; determining, based on a difference between at least one of the first timestamp and the second timestamp, or the first geolocation information and the second geolocation information, that a first event of a first monitored event class has occurred between the first time and the second time; generating, based on the first monitored event class and in response to determining the first event has occurred after the second time, a first alert on the mobile computing device, wherein the first alert comprises a prompt for additional information to be associated with the first event; causing to be stored at a computer system, information about the first event including the first monitored event class and any additional information associated with the first event that is received in response to the first alert.

Some aspects of the disclosure relate to computer implemented techniques for inferring events based on behavior that has been identified automatically by a computer-based inferred event detection system. In one embodiment, benefits of the techniques herein can improve individual productivity during business travel because employees are freed of the need to constantly remember whether to enter expense data or record details of qualifying events. In an embodiment, expense reporting, recording and reimbursement is more efficient in terms of computer processor time and use of memory and storage space.

2.0 Structural Overview

FIG. 1 is a block diagram of computer systems usable with an inferred event detection system, according to an embodiment.

FIG. 1 illustrates a mobile computing device 101 and a server computer 116, which are communicatively coupled directly or indirectly via network 115. The mobile computing device 101 and the server computer 116 may include various components that are implemented, in an embodiment, using one or more computer programs, other software elements, which are stored on computer-readable media and loaded and executed from that media, or using a combination of software, firmware and hardware. Each of the components, in one embodiment, comprises a set of computer program instructions forming part of one or more executables. In an embodiment, the programs and instructions may be implemented using a software development environment such as RUBY ON RAILS and/or programming languages such as C, C++, JAVA, OBJECTIVE-C, and the like.

The mobile computing device 101 may comprise a laptop computer, tablet computer, smartphone, or any other type of mobile computing device that allows execution of applications. Typically the mobile computing device 101 executes an operating system, which is omitted for clarity, and hosts the inferred event detection system 100 as one or more applications or apps, services or other executables. The inferred event detection system 100 may comprise an application installed at the mobile computing device 101. For example, the inferred event detection system 100 may be downloaded from an application store of the mobile computing device 101. The mobile computing device 101 is portable so that it can be moved or carried while continually providing information to the inferred event detection system 100 and while continually providing information over network 115 to server computer 116 using wireless telecommunication such as cellular radiotelephone communication or wireless packet networking such as WiFi.

The mobile computing device 101 may include utility components that supply information to the inferred event detection system 100. In one embodiment, mobile computing device 101 comprises a geolocation component 102, a time component 103, and a digital image capture component 104. The geolocation component 102 may include one or more methods for determining a location of the mobile computing device 101 at any given time. Some examples of these methods include using triangulation using cellular radiotelephone tower information, receiving coordinates from a global positioning system (GPS) antenna, detecting a Bluetooth beacon, detecting a Near Field Communication tag, or any combination of the foregoing. The inferred event detection system 100 may not need to access the underlying hardware of the mobile computing device 101 to retrieve this information. For example, the inferred event detection system 100 may implement various features provided in an API of an operating system executing on the mobile computing device 101 to retrieve the location information.

The time component 103 may include one or more methods for determining time information accessible by the inferred event detection system 100. The time information may be provided by a system clock of the mobile computing device 101, an operating system of the mobile computing device 101, from a network source such as a time website via an HTTP GET request or an API call, or any combination of these. Based on the time information, the inferred event detection system 100 may produce timestamps to associate with inferred events detected by the inferred event detection system 100.

The digital image capture component 104 may include a camera or other system for capturing information in a physical form to a digital form. As is discussed in greater detail elsewhere, some examples of items in physical form to be captured as part of the inferred event detection system 100 may include receipts and other records of qualifying events.

In an embodiment, the inferred event detection system 100 is an application comprising a trigger detection component 105, an event determination component 106, a rules-based classification component 108, an alert component, a feedback component 112, and an event updating component 114. These components may be implemented as software components such as packages, objects, methods or scripts that are installed or dynamically linked as part of loading or executing the inferred event detection system 100.

The trigger detection component 105 is programmed or configured for determining when the inferred event detection system 100 checks the mobile computing device 101 for updated information. In an embodiment, the trigger detection component 105 is programmed to determine when to check for updated information using a polling method or an operating system method. In one embodiment, a polling method specifies time intervals, or a schedule, that controls when the inferred event detection system 100 checks the geolocation and time information of the mobile computing device 101. For example, the inferred event detection system 100 may check the mobile computing device 101 for information every minute, every five minutes, or any other interval of time, or according to a fixed schedule.

In an embodiment, the inferred event detection system 100 uses an operating system-assisted method to determine when to trigger a refresh of information for the inferred event detection system 100. The inferred event detection system 100 may use features provided by an operating system of the mobile computing device 101. For example, the IOS operating system of APPLE, INC. provides application programming interfaces (APIs) including an API that programs can call to detect significant location changes of the mobile computing device 101 that is running IOS. When a large change in location is detected by the operating system, an event is generated that can be detected programmatically using an API call. In response, the trigger detection component 105 is programmed to refresh information for the inferred event detection system 100. The magnitude of a change in location that triggers such an update is configurable and updates could occur in response to movement of 50 meters, 100 meters, 500 meters, etc.

The event determination component 106 operates in conjunction with the rules-based classification component 108. For example, the event determination component 106 determines whether a qualifying event has occurred. If the event determination component 106 determines that a qualifying event has occurred, then the event determination component 106 provides information about the qualifying event to the rules-based classification component 108. The rules-based classification component 108 determines what class of qualifying event has occurred, based on stored data or program instructions that define rules.

In an embodiment, the rules-based classification component 108 is programmed or configured for determining, based on the various data gathered by the inferred event detection system 100, what classification to assign to a particular inferred event. For example, a qualifying event may be classified using a travel classification and a location classification. Other embodiments may use other classifications. The classifications that are determined by the rules-based classification component 108 may be updated over the network 115. For example, additional classifications or changes to existing classifications may be provided by the server computer 116 to the mobile computing device 101 over the network 115.

In an embodiment, the inferred event detection system 100 includes an alert component 110 that is programmed or configured for notifying a user of the mobile computing device 101 that the inferred event detection system 100 has detected an inferred event. The alert component 110 may include one or more ways of notifying the user. Some examples include a lock-screen notification, a pull-down drawer notification, an in-application notification or alert, or any other method to display alerts on the mobile computing device 101.

In an embodiment, the alert component 110 uses a lock-screen notification to alert the mobile computing device 101. This means that, even if the mobile computing device 101 is locked or idle, the alert component 110 causes generating an alert on the mobile computing device 101. The lock screen may be generated by an operating system of mobile computing device 101, with information provided by the alert component 110. The alert on the lock screen may include limited information of what inferred event has been detected for privacy reasons. If the alert is selected, additional information may be shown when the user accesses an application for the inferred event detection system 100. More than one alert from the alert component 110 may be included on the lock screen of the mobile computing device 101 at a given time.

Alerts generated by the alert component 110 may cause additional notification types to a user other than a visual indication. For example, audio (e.g., a ring, buzz, tone, or other audible alert) or tactile (e.g., long vibration, short vibration, vibration pattern) notification types may occur at the mobile computing device 101 in conjunction with an alert.

The feedback component 112 may include various options for a user to interact with the inferred event detection system 100, after an alert has occurred. For example, the inferred event detection system 100 provides an alert. The user may have various options on how to interact with the alert. Some examples of how a user may interact with the alert include ignoring the alert, snoozing the alert to cause reasserting the alert a few minutes later, or providing additional details with the alert. If the user chooses to snooze the alert, the alert is temporarily removed from the mobile computing device 101. For example, if the alert is part of a lock screen notification, the notification corresponding to the alert is temporarily removed if the snooze response is selected. The user may also select when they would like the snoozed alert to reappear as a new alert. If the user chooses to provide additional details, the event updating component 114 receives additional details to associate with the alert. For example, the user may provide additional details with the qualifying event associated with the alert. Some examples include the user typing characters on the mobile computing device 101 or capturing a digital representation of a physical asset to include with the inferred event.

The server computer 116 may include components that supply information to the inferred event detection system 100. For example, the server computer 116 may comprise a data feed component 118, an administrative component 120, and an approval component 122. In an embodiment, data feed component 118 may gather information that is available at the server computer 116 or other computing devices separate from the mobile computing device 101. Examples of data feeds that the data feed component 118 may access include credit card information, traveling booking portal information, information scrapped from an email account, or any combination of these. This information may be used to prepopulate qualifying events for a trip, for example.

As a specific example, credit card information may show that an airline ticket was purchased for a flight on January 9, which is the same day that a trip begins for a particular individual associated with mobile computing device 101. The inferred event detection system 100 may automatically enter the flight information in an expense report record. Alternatively, the inferred event detection system 100 may determine from information gathered by the data feed component 118 that a trip is about to occur. For example, if a travel booking system shows that a train trip has been purchased for an employee, the inferred event detection system 100 may be programmed to use this information to associate the dates of when the train trip will occur with the employee's user account.

In an embodiment, administrative component 120 is configured or programmed to accept input specifying certain default values for the system. Some embodiments may require a login using administrator credentials to set the default values. In an embodiment, a travel classification for an inferred event could be set to default to private vehicle travel, but if company policy allows for taxi travel and taxi usage occurs more often than private vehicle travel, then an administrator could use a programmed interface delivered by the server computer 116 to configure that all travel category inferred events should default to the taxi travel classification.

The approval component 122 is programmed or configured to prepare, for a selected business trip, a report of qualifying events that are associated with the trip. There may be one or more qualifying events for a given trip. For each qualifying event associated with a trip, the approval component 122 is programmed to receive input specifying acceptance or rejection of the qualifying event.

Network 115 may be implemented by any medium or mechanism that provides for the exchange of data between the various elements of FIG. 1. Examples of network 115 include, without limitation, a cellular network, communicatively coupled with a data connection to the mobile computing device 101 over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 115 is shown as a single element but in practice, network 115 may comprise one or more local area networks, wide area networks, and/or internetworks. The various elements of FIG. 1 may also have direct (wired or wireless) communications links, depending upon a particular implementation.

3.0 Example Embodiment of Generating Inferred Events

In an embodiment, the inferred event detection system 100 is programmed or configured for determining, after location information has been collected, whether a qualifying event occurred. Embodiments may be programmed to address difficulties in creating expense reports in prior approaches, such as remembering to record qualifying events, ensuring the right details are included for each qualifying event, and allowing more timely submission of expense reports. The inferred event detection system 100 may include a feature that passively tracks the location of a mobile computing device 101 while the device moves, for example, by periodically reading data values specifying a GPS location or other location of the device via calls to operating system services.

Figure 2:
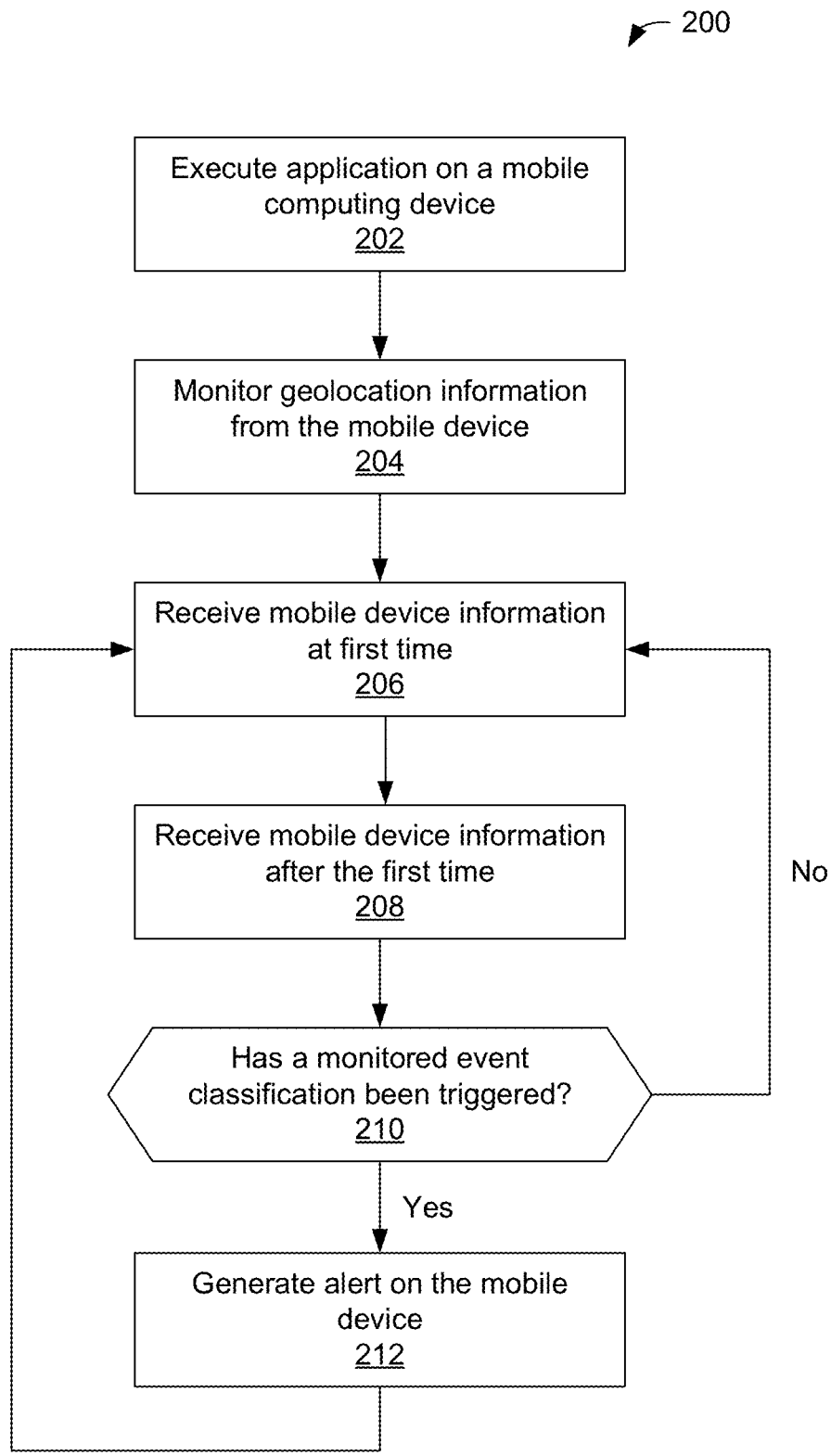
FIG. 2 is a flowchart of a method of generating inferred events, according to an embodiment.
Figure 3:
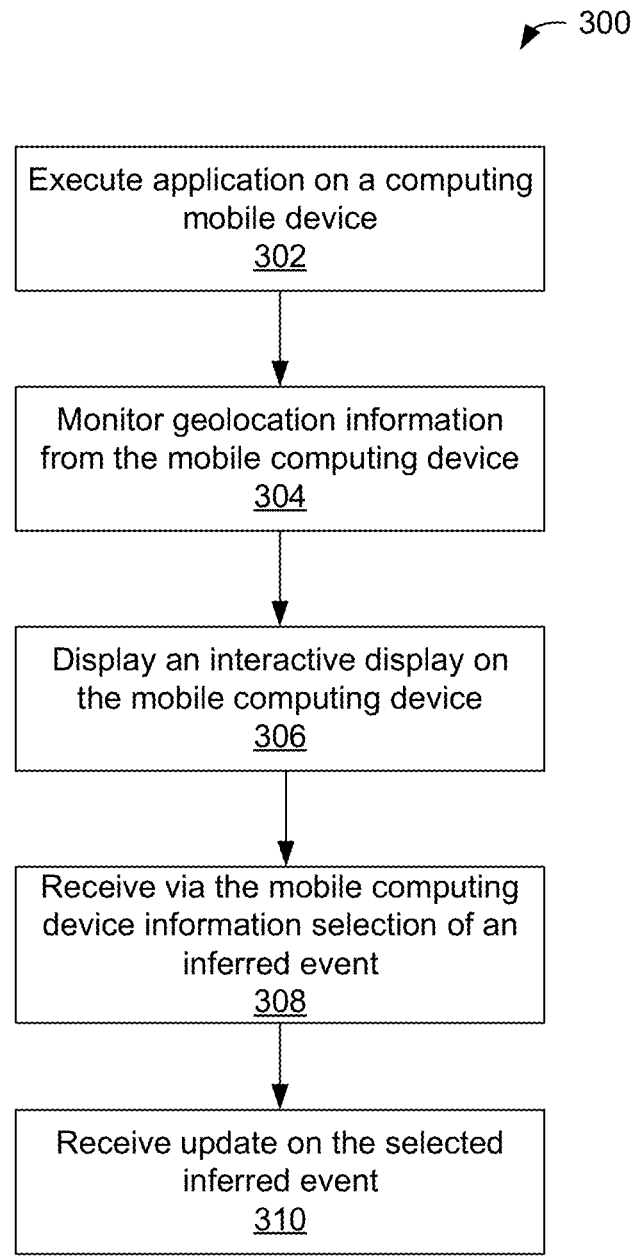
FIG. 3 is a flowchart of a method of generating a wrap up view, according to an embodiment.

FIG. 2 is a flowchart of a method of generating inferred events, according to an embodiment, including a flow 200. Each of FIG. 2 and FIG. 3 illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 and FIG. 3 are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

In step 202, the inferred event detection system 100 executes on a mobile computing device. The inferred event detection system 100 may be an application installed on the mobile computing device that has access to various pieces of information provided to the inferred event detection system 100 by the mobile computing device or from a server.

3.1 Processing Without Receiving an Explicit Request

In step 204, the inferred event detection system 100 is programmed to monitor geolocation information that is received from the mobile computing device 101. The geolocation information may include a timestamp specifying when the geolocation information was collected.

In an embodiment, the monitoring of geolocation information from the mobile computing device 101 occurs without an explicit request by a user of the mobile computing device. Some examples of an explicit request include the user interacting with a touchscreen to select an app feature or function, interacting with a peripheral connected to the mobile computing device, or other input component of the mobile computing device 101. Instead, the inferred event detection system 100 executes in a background computing area of the mobile computing device, even when the user is not viewing or providing direct input to the mobile computing device, to identify changes in location of the device for use as a basis of other operations.

In an embodiment, the user may provide direct input to the mobile computing device 101 while the inferred event detection system 100 concurrently passively tracks movement of the device by interacting with an application on the mobile computing device. For example, the user could be reading emails using an email application while the inferred event detection system 100 monitors for qualifying events. As another example, the user could be interacting with the inferred event detection system 100, while providing input that is separate from an inferred event. For example, the user could be entering information to be associated with a first inferred event via the inferred event detection system 100, while the inferred event detection system detects a second inferred event; as a specific example, the user could be updating data relating to a meal while riding in a taxi during the same trip that included the meal.

3.2 Monitoring for Inferred Events

In step 206, the inferred event detection system 100 receives information from the mobile computing device 101 at a first time. For example, the information includes geolocation information specifying a location of the mobile computing device at the first time, and a timestamp specifying when the geolocation information was collected. The geolocation and the timestamp are stored in app storage.

In step 208, the inferred event detection system 100 receives second information from the mobile device at a second, different time after the first time. Location data and a second timestamp also are received. Based on the data from step 206 and step 208, if a change in location is indicated, then the system 100 is programmed to investigate whether a qualifying event has occurred, as next described. Thus, passive monitoring of changes in the location of the device, based on geolocation data and clock or timestamp data, can form the basis of detecting whether a qualifying event occurred and whether an expense should be recorded, without requiring a user to specify that an expense event occurred.

3.3 Classification for Inferred Events

In step 210, the inferred event detection system 100 determines whether a monitored event classification been triggered. Triggering a monitored event classification may comprise detecting that a change in location of the mobile computing device 101 to a new location, in combination with other data that identifies candidate events, indicates the occurrence of an event that is within a specified classification for which an expense record should be created. The other data may comprise point of interest data obtained by querying a map via an API. If a monitored event classification has not occurred, then the inferred event detection system 100 returns to step 206. For example, the user may be performing activities that do not fall into a monitored event classification, such as sleeping or visiting a vendor. However, if a monitored event classification has occurred, the inferred event detection system 100 proceeds to step 212.

In an embodiment, the inferred event detection system 100 uses a rules-based classification system to determine whether an inferred event is a qualifying event and, if so, what classification of qualifying event has occurred. In an embodiment, the rules-based classification includes rules for detecting location-based and travel-based events.

Location Classification. If a device 101 is in a location without moving for more than a specified or configured amount of time, the inferred event detection system 100 may determine that the device is at a merchant location. The merchant location may be a restaurant, office supplies store, or other merchant. In some embodiments, in response to detecting presence at a merchant location, the system 100 is programmed to cause the device 101 to display a window or panel that prompts the user to enter data about an expense that could have occurred or is occurring. If the device 101 responds by providing input to the inferred event detection system 100 with a confirmation, the inferred event detection system is programmed to receive data input for additional details about the event. In one embodiment, system 100 is programmed to receive a tap specifying entering a receipt, and in response, to activate a camera app of the device 101 to permit capturing a digital image of a paper receipt to be associated with an expense record for the inferred event.

Travel Classification. Travel or transit classification may include inferred qualifying events such as driving a vehicle, riding in a taxi, taking a train, or aircraft travel. As previously described, the inferred detection system 100 is programmed to detect when a device 101 has moved, and information about the start and end point of a movement in combination with timestamps may be used to infer a speed of travel and therefore a mode of travel. For example, movement greater than 15 miles per hour may be programmed as indicating movement by car. Geographic data may be combined with travel indications to determine whether a rail line appears to be in use. Travel associated with a qualifying expense also may be inferred solely based on location; for example, if the endpoints of a trip are determined, based on stored contact file records or point of interest data from a map, to be associated with a work location and a supplier site, then the inferred event detection system 100 may be programmed to determine that a travel classification event has occurred.

In an embodiment, the inferred event detection system 100 is programmed with criteria that define the classifications. Thus, for an inferred event to be classified within a particular classification, the criteria for that classification must be satisfied by available data. Criteria may be based on geolocation data or time information. For example, to qualify an inferred event in the location classification, the first geolocation information and second geolocation must be similar and a difference between the first timestamp and the second timestamp should be within a specified threshold. As a specific example, if a device 101 is at a store because the user is purchasing office supplies, then the inferred event detection system 100 may detect that the user has been in the same general vicinity of for at least 10 minutes. To qualify the inferred event as a travel classification event, the inferred event detection system 100 may detect that the first geolocation and the second geolocation are greater than a certain distance. For example, a user must travel at least half a mile or more, before the inferred event detection system 100 is programmed to classify the inferred event as a travel classification event.

3.4 Generating an Alert

In step 212, the inferred event detection system 100 generates an alert on the mobile computing device. In an embodiment, the alert is an alert that appears on a lock screen of the mobile computing device. In alternate embodiments, the alert is an alert that appears in a notification area of the mobile computing device. For example, the alert appears as part of a notification drop-down menu when a user swipes downwards from the top of a mobile computing device screen.

The alert may be timed to appear at different times, depending on what category the inferred event falls into. For example, if the inferred event is of the travel category, an alert for the inferred event may appear at the end of transit (whether car, taxi, train, plane, or other). The inferred event detection system 100 may include information related for the inferred event, such as details of their trip (e.g., "You have just traveled 22 miles"). The user may select the alert and the inferred event detection system 100 will automatically record the inferred event as well as the requisite details that the inferred event detection system 100 captured (e.g., start/end location, distance, time).

In an embodiment, the alert may be a push notification alert. This means that the alert was generated on the mobile computing device, in response to a message received by a server.

After the alert has been generated, the inferred event detection system 100 returns to step 206 to monitor for possible additional inferred events. For example, a different inferred event than the inferred event for which the alert is generated in step 212 may occur. The inferred event and the different inferred event may share at least one timestamp or item of geolocation information. For example, a user drives to a restaurant during a business trip. In this example, the inferred event detection system 100 may detect that a travel classification event has occurred and afterwards a location classification event has occurred. The geolocation information of where the inferred travel event ends and where the location classification event begins may be the same.

4.0 Example Embodiment of an Inferred Events Summary

In an embodiment, the inferred event detection system 100 provides features to allow a user to review inferred events that occurred for a given period of time, and allow the user to add, change, or remove inferred events detected by the inferred event detection system 100. For example, when a business trip is complete and a user decides to stop the inferred event detection system 100 from monitoring further events, the inferred event detection system 100 may present a 'wrap up view' for the user. The wrap up view may include a map portion and a timeline portion. The timeline portion may include graphical representations of the locations or transit categorized events that the inferred event detection system 100 detected. The user may graphically view their inferred events in timeline format with accompanying map view, see what they have already added to their report, what they have not added, and other associated information. FIG. 3 is a flowchart of a method of generating a wrap up view, according to an embodiment, including a flow 300.

In step 302, the inferred event detection system 100 executes on a mobile computing device. In step 304, the inferred event detection system 100 is programmed to monitor geolocation information from the mobile computing device. When the wrap-up view is accessed, the inferred event detection system 100 may have been executing for a period of time sufficient to have monitored multiple inferred events at the mobile computing device.

4.1 Displaying a Wrap Up View

In step 306, the inferred event detection system 100 displays an interactive display on the mobile computing device. The wrap up view may include at least a timeline interface element and a map interface element. The timeline interface element comprises a plurality of inferred event interface elements, each inferred event interface element representing the inferred events in a chronological order. The map interface element comprises a map view adjustable according to selecting one or more of the plurality of inferred event interface elements.

4.2 Updates in the Wrap Up View

In step 308, the inferred event detection system 100 receives via the mobile computing device information that an inferred event has been selected. For example, the user may select a graphical interface element of the timeline interface element that corresponds to one or more inferred events detected by the inferred event detection system 100.

In step 310, the inferred event detection system 100 receives an update on the selected inferred event. The selected inferred event may include at least one item of geolocation information. The map interface element is updated to show the at least one geolocation information. For example, for an inferred event of the travel classification, the inferred event detection system 100 may update the map interface element to show two locations, connected with by a line. The line may represent a route taken by the user from the first location to the second location. As another example, the map interface element may re-center the map, according to one or more of the locations selected.

5.0 Example Implementation of an Inferred Event Detection System With Alerts Using a Graphical User Interface FIG. 4, FIG. 5, FIG. 6, and FIG. 7 are diagrams of graphical user interface screen displays that show different screen captures of example functional output of the inferred event detection system 100, in an embodiment.

Figure 4:
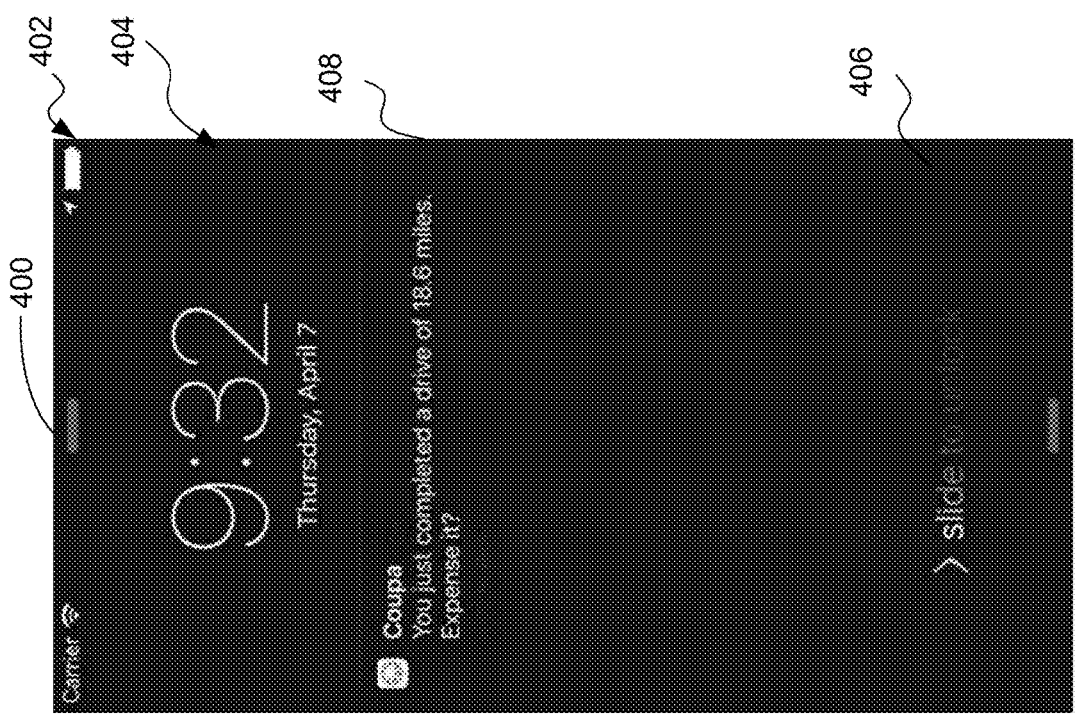
FIG. 4 shows, in an embodiment, an inferred event detection system that is programmed to display on a lock screen of a mobile computing device an alert for an inferred event with a travel classification.

Referring to FIG. 4, in an embodiment, the inferred event detection system 100 is programmed to display on a lock screen 400 of a mobile computing device an alert for an inferred event with a travel classification. The lock screen 400 comprises a device status bar 402, a date and time portion 404, a slide to unlock portion 406, and an alert portion 408. The device status bar 402 provides various details of the mobile computing device, such as a cellular network provider the mobile computing device is communicatively coupled to the Internet through, an indication that GPS information is currently being accessed, and a charge status. The slide-to-unlock portion 406 comprises an indication on how to unlock and access features of the mobile computing device. For example, in this screen capture, the device may be unlocked by sliding a finger across the screen from left to right.

The lock screen 400 includes an alert portion 408. Currently, there is only one alert item in the alert portion. For example, the alert item may appear after the inferred event detection system 100 has determined the inferred travel event has been completed. However, there may be more than one alert item and if the number of alert items exceeds a maximum number of alert items that may be shown on the lock screen at a given time, sliding a finger up or down on the alert portion 408 will allow scrolling through the alert items. For the alert item shown, a specific application that generated the alert (i.e., COUPA application) is shown. The alert item corresponds to an inferred event detected that the inferred event detection system 100 determined corresponded to a travel classification. The alert also includes additional information on the inferred event, such as the length of the travel (e.g., 18.6 miles).

Figure 5:
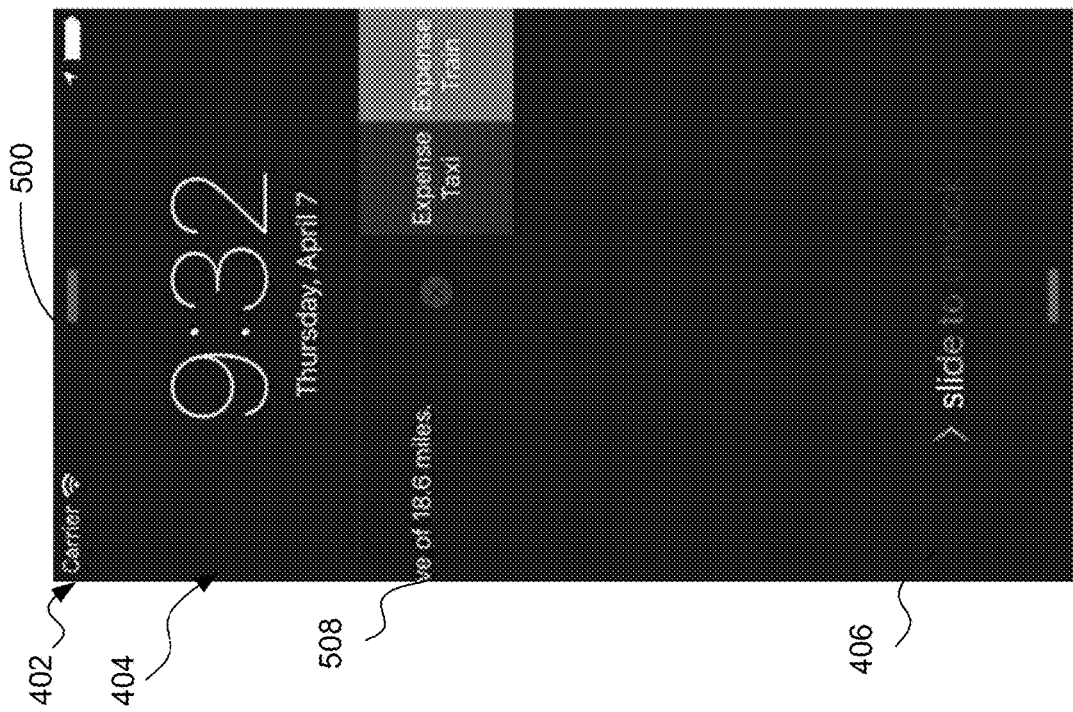
FIG. 5 shows, in an embodiment, the inferred event detection system programmed to display on a lock screen of a mobile computing device the alert for an inferred event with a travel classification after a user interaction.

Referring to FIG. 5, in an embodiment, the inferred event detection system 100 is programmed to display on a lock screen 500 of a mobile computing device the alert for an inferred event with a travel classification after a user interaction. The lock screen 500 comprises the device status bar 402, the date and time portion 404, the slide to unlock portion 406, and an alert portion 508. The user interaction with the lock screen 500 may include swiping using a finger, from left to right, of the alert portion 408 of FIG. 4. In the lock screen 500, the alert portion 508 has been updated after the user interaction to reveal additional possible input for the alert item. For example, since the alert item corresponded to the travel classification, the inferred event detection system 100 determines that for the alert item, there may be an update required to change from a default travel mode (by taxi) to another travel mode (by train). A user may select the appropriate indication for "Expense Taxi" or "Expense Train" to update information associated with the inferred event stored in the inferred event detection system 100.

Figure 6:
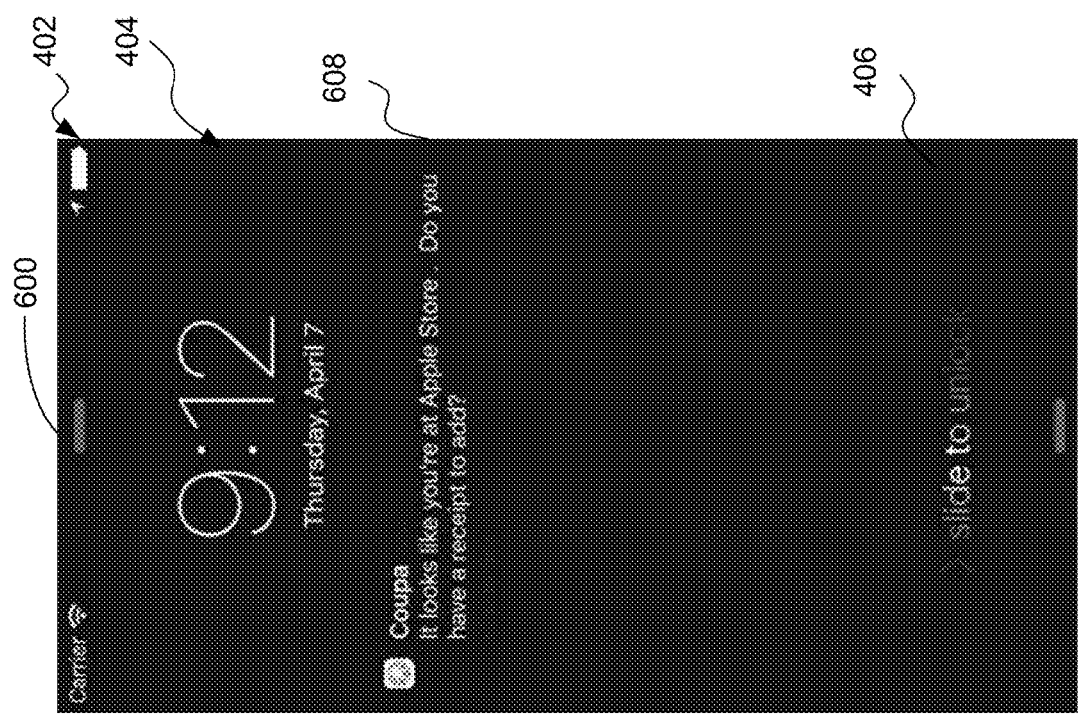
FIG. 6 shows, in an embodiment, the inferred event detection system programmed to display on a lock screen of a mobile computing device the alert for an inferred event with a location classification.

Referring to FIG. 6, in an embodiment, the inferred event detection system 100 is programmed to display on a lock screen 600 of a mobile computing device the alert for an inferred event with a location classification. The lock screen 600 comprises the device status bar 402, the date and time portion 404, the slide to unlock portion 406, and an alert portion 608. For the alert item shown in the alert portion 608, the alert item corresponds to an inferred event detected by the inferred event detection system 100 and classified as an inferred location event. The alert includes additional information on the inferred event, such as a location where the inferred event detection system 100 has determined the inferred location event occurred. For example, the lock screen 600 shows the inferred event as having occurred at an APPLE INC. store. The alert item in alert portion 608 further indicates that, by selecting the alert, a receipt may be added to the inferred event.

Figure 7:
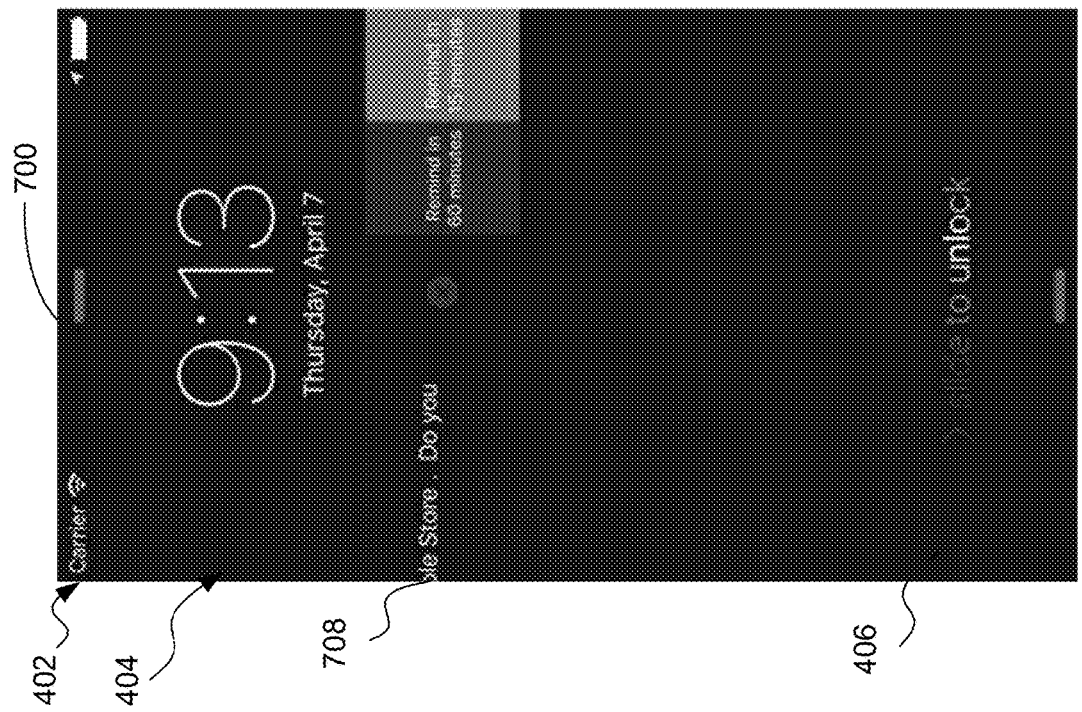
FIG. 7 shows, in an embodiment, the inferred event detection system programmed to display on a lock screen of a mobile computing device the alert for an inferred event with a travel classification after a user interaction.

Referring to FIG. 7, in an embodiment, the inferred event detection system 100 is programmed to display on a lock screen 700 of a mobile computing device the alert for an inferred event with a travel classification after a user interaction. The lock screen 700 comprises the device status bar 402, the date and time portion 404, the slide to unlock portion 406, and an alert portion 708. The user interaction with the lock screen 700 may include swiping using a finger, from left to right, of the alert portion 608 as shown in FIG. 6. In the lock screen 700, the alert portion 708 has been updated after the user interaction to reveal additional possible input for the alert item. For example, the inferred event detection system 100 may indicate that the alert item may be temporarily dismissed and reappear later. This may be because the alert item is generated before a user has time to complete their visit at the APPLE INC. store or is currently too busy to provide additional details on their visit. A user may select the appropriate indication for "Remind in 60 minutes" or "Remind in 15 minutes" depending on how long the user believes they will need before they can provide additional information to the inferred event detection system 100.

Figure 10:
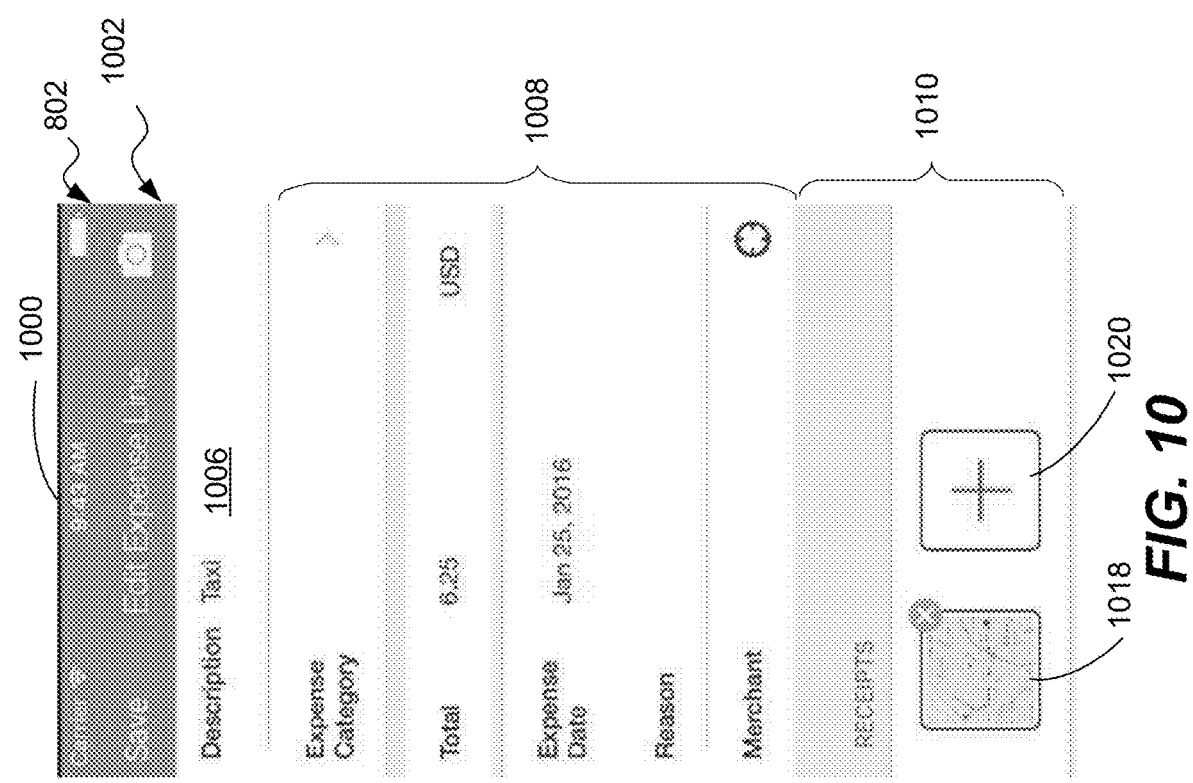
FIG. 10 shows, in an embodiment, the inferred event detection system programmed to display a screen on a mobile computing device to edit a qualifying item for an expense report.

6.0 Example Implementation of an Inferred Event Detection System Modifying Inferred Events Using a Graphical User Interface FIG. 8, FIG. 9, and FIG. 10 are diagrams of graphical user interface screen displays that show different screen captures of example functional output of the inferred event detection system 100, in an embodiment.

Referring to FIG. 8, in an embodiment, the inferred event detection system 100 is programmed to display a screen 800 on a mobile computing device for an expense report. The screen 800 comprises a device status bar 802, an expense report title 804, a title bar 806, a current total bar 808, an expense items listing portion 810, an approvals portion 812, and a function toolbar 814. The device status bar 802 provides various details of the mobile computing device, such as a cellular network provider the mobile computing device is communicatively coupled to the Internet through, an indication that GPS information is currently being accessed, and a charge status. The expense report title 804 provides a number indicating the current expense report number. For example, on screen 800 the expense report is numbered 325. The title bar 806 provides a text field for indicating a description of the business trip. In addition to the number for the expense report indicated by the expense report title 804, this allows users to provide easy-to-remember text label to associate with a particular expense report. For example, for the expense report 325 shown in screen 800, the text label is "Business Trip." Some other examples of text labels include places the trip was to (e.g., "San Jose, Calif.," "San Francisco, Calif.") or the purpose of the trip (e.g., "Display Vendor Visit," "Manufacturer Check up").

The expense items listing portion 810 shows one or more expense items associated with the current expense report. The current total bar 808 provides a tally of amounts spent at each of the expense items currently listed with the expense items listing portion 810. For example, the current total bar currently shows 10.23, which is the sum of the qualifying events currently shown in the expense items listing portion 810. The current total bar 808 will update the total shown as expense items are added, removed, or modified from the expense items listing portion 810. The expense items listing portion 810 currently shows expense items 816 and 818. Expense item 816 is a qualifying event with a location classification and includes an indication (e.g., a paperclip). The indication is used to show that for the expense item 816, a digital representation of a bill or other qualifying information is included for the expense item. In an alternate embodiment, if an expense item requires additional qualifying information, an indication may be provided to the user to indicate that additional information is needed. By selecting the expense item, the user is able to provide the additional qualifying event information. Expense item 818 is a qualifying event with a travel classification. The expense item 818 corresponds to travel in a personal vehicle by the user. To attribute a cost to the expense item 818, the inferred event detection system 100 may calculate, based on a rate established by a company the user is associated with and the distance that was traveled, the total qualifying cost of the qualifying item.

The approvals portion 812 includes a visual representation of how, when the expense report shown in FIG. 8 is submitted, how to get the expense report approved. For example, the approvals portion indicates that a particular user will review the submitted expense report.

The function toolbar 814 provides additional features accessible within the inferred event detection system 100. Five icons are shown in the function toolbar 814, each corresponding to a different feature of the inferred event detection system 100. For example, a camera icon, when selected, will allow the user to capture a digital representation of a physical asset and allow the user to associate the digital representation with a qualifying item. A multiple windows icon, when selected, will allow the user to switch between various views of information provided by the inferred event detection system 100. A plus icon, when selected, will allow the creation of a new expense report. A microphone icon, when selected, will allow recording of a voice memo. This allows the user to make notes to themselves, regarding a qualifying item. For example, the voice memo may be "Receipts to capture are in briefcase," so that the user does not forget where they stored their receipts.

Referring to FIG. 9, in an embodiment, the inferred event detection system 100 is programmed to display a screen 900 on a mobile computing device for another expense report. The screen 900 comprises a device status bar 802, an expense report title 804, a title bar 806, a current total bar 808, an expense items listing portion 810, an approvals portion 812, and a function toolbar 814. The approvals portion 812 includes qualifying items 916 and 918. The qualifying item 916 corresponds to travel in a taxi by the user and includes an indication (e.g., a paperclip). The indication indicates that a digital representation of a physical asset (e.g., receipt for taxi ride) is needed with the qualifying item 916 and has been included. A cost for the taxi ride is included either manually by the user (e.g., user enters total cost to associate with the qualifying item 916) or through extraction from the digital representation associated with the qualifying item 916 (e.g., through optical character recognition of a receipt). The qualifying item 918 corresponds to a location classification type qualifying item. For example, the qualifying event may be a trip to BIG SUPER MARKET for food supplies to attendees of a conference.

Referring to FIG. 10, in an embodiment, the inferred event detection system 100 is programmed to display a screen 1000 on a mobile computing device to edit a qualifying item for an expense report. The screen 1000 comprises a device status bar 802, an options bar 1002, a description bar 1006, a qualifying event editing portion 1008, a digital asset portion 1010. The options bar 1002 includes a save option (indicated by the words "Save") and a capture digital representation option (indicated by the camera icon). For example, the user may access a camera using the camera icon then, once they have finished providing information on the qualifying event, select the save option to save changes made to the qualifying event for inclusion with an expense report.

The description bar 1006 provides a textual description of the qualifying event. The qualifying event editing portion 1008 comprises various details on the currently selected qualifying event that may be editable by the user. For example, the qualifying event editing portion 1008 includes an expense category (e.g., from travel classification to location classification), an amount spent (e.g., a dollar and cents amount spent), an expense date, a reason for the expense, and a merchant identifier. The reason for the expense may assist in explaining why a particular expense is a qualifying event (e.g., a business expense that is generally reimbursable to users as a business related activity). For example, while going to an office supplies store to purchase materials for a presentation to clients are generally qualifying, going to the office supplies store to purchase materials for a child's science fair project are generally not qualifying. The user may enter an optional description here, so that they may keep track of a reason why this particular expense is qualifying. The merchant identifier included with the qualifying event editing portion 1008 may include a name of the merchant, not shown on screen 1000. The merchant identifier may be any identifier that allows associating the qualifying event with a merchant. For example, the merchant identifier may be a name of a store, latitude and longitude coordinates, or other location information on where the qualifying event occurred.

The digital asset portion 1010 comprises one or more icons that represent information that is currently stored with the qualifying event. The user may add additional digital assets to be associated with the qualifying event, by selecting a plus icon 1020. The inferred event detection system 100 may also automatically include a map icon 1018 as a digital asset for a qualifying event. The user may review where a certain qualifying event has occurred on a map, to assist them in remembering where the qualifying event occurred and what the qualifying event included.

Figure 11:
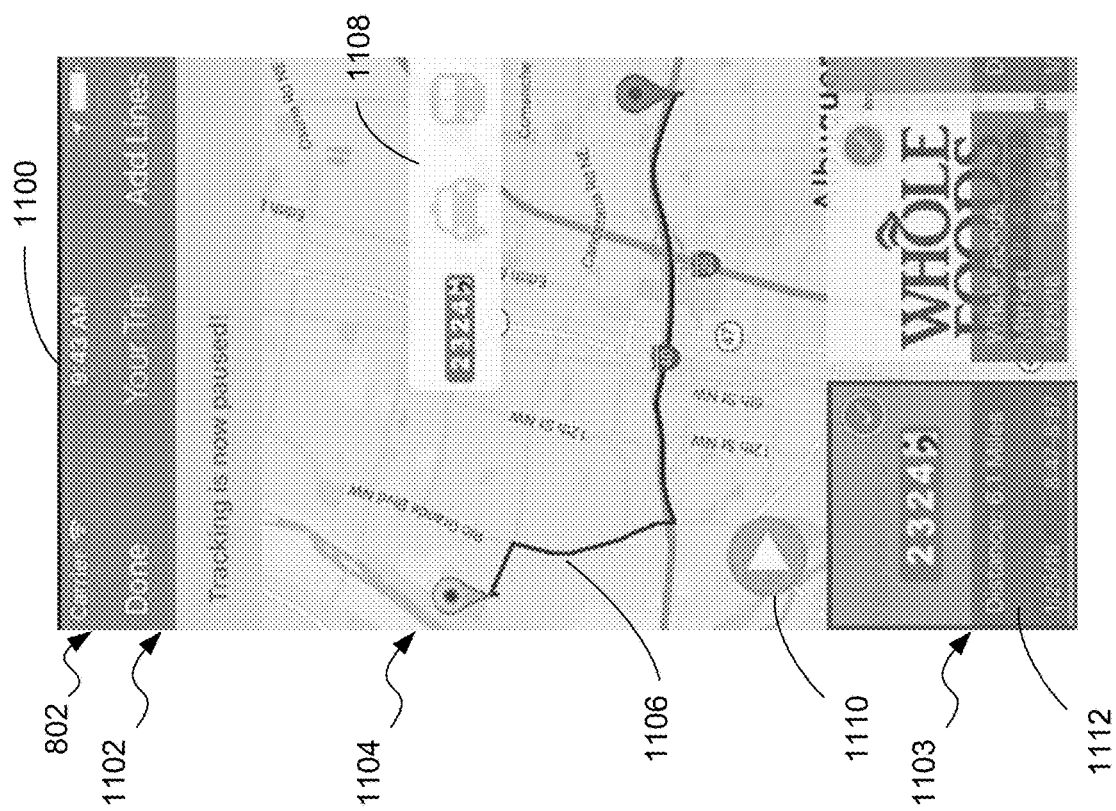
FIG. 11 shows, in an embodiment, the inferred event detection system programmed to display a screen on a mobile computing device for a wrap up view for an expense report.

7.0 Example Implementation of an Inferred Event Detection System in a Wrap Up View Using a Graphical User Interface FIG. 11, FIG. 12, and FIG. 13 are diagrams of graphical user interface screen displays that shown different screen captures of example functional output of the inferred event detection system 100 in a wrap up view, in an embodiment.

Referring to FIG. 11, in an embodiment, the inferred event detection system 100 is programmed to display a screen 1100 on a mobile computing device for a wrap up view for an expense report. The screen 1100 comprises a device status bar 802, a trip status bar 1102, a map portion 1104, and a timeline portion 1103. The trip status bar 1102 comprises a "Done" indicator and an "Add Lines" indicator. The "Done" indicator, when selected by the user, exits the wrap up view. The "Add Lines" indicator allows the user to select one or more inferred events from the timeline portion 1103, and add them to an expense report. For example, the timeline portion 1103 currently shows inferred travel event 1112 for a travel of distance 6.1 miles selected. The map portion 1104 comprises a route 1106, a route details popup 1108, and a start/pause button 1110. The route 1106 represents a route taken by the user between two geolocation points collected by the inferred event detection system 100 for the selected inferred travel event 1112. The route details popup 1108 include options that the user may choose to change details with the selected inferred travel event 1112. For example, the route details popup 1108 includes allowing the user to change the distance traveled or the mode of transportation used (e.g., personal vehicle, taxis, public transportation). In screen 1100, the mode of transportation currently selected is the personal vehicle icon.

The start/pause button 1110 allows the user to temporarily pause the inferred event detection system 100 from detecting additional inferred events. This may be useful if the user has completed their workday and want to stop further events from being tracked. To pause the inferred event detection system 100 from detecting inferred events, the user may select the start/pause button 1110. To resume the inferred event detection system 100 to detect inferred events, the user may select the user may select the start/pause button 1110.

Referring to FIG. 12, in an embodiment, the inferred event detection system 100 is programmed to display a screen 1200 on a mobile computing device for editing an inferred event in a wrap up view for an expense report. The screen 1200 comprises a device status bar 802, a trip status bar 1102, a map portion 1104, and a timeline portion 1103. For example, screen 1200 may appear after the user has selected in FIG. 11 a taxi icon in the route details popup 1108. The route details popup has been updated to create an updated route details popup 1208. Additional information may be requested by the inferred detection system 100 when a change in route details is made. For example, the inferred event detection system 100 requests a total for the taxi trip, which was previously unnecessary when the personal vehicle mode of transportation was selected.

Referring to FIG. 13, in an embodiment, the inferred event detection system 100 is programmed to display a screen 1300 on a mobile computing device for editing another inferred event in a wrap up view for an expense report. The screen 1300 comprises a device status bar 802, a trip status bar 1102, a map portion 1104, and a timeline portion 1103. In the timeline portion 1103, an inferred event represented by the icon 1302 is selected. The inferred event corresponds to a location event classification, so a popup 1304 corresponding to location details appears. The inferred event detection system 100 allows the user to verify whether a location name for the inferred event is correct.

In an embodiment, the merchant identifier is the name of a store that is determined by the inferred event detection system 100. The name of the store is not provided by the user but instead, using the geolocation information gathered by the inferred event detection system 100 while the qualifying event occurs, gathered from a database of names of stores and their location by the mobile computing device. For example, if the geolocation information comprises latitude and longitude information of the inferred event, a query is made to a geolocation service that is located on a remote computer. The remote computer returns one or more names of stores that may correspond to the geolocation information. For example, the remote computer may return one store name. If the remote computer returns more than one store name however, the inferred event detection system 100 allows the user to select from the returned store names which they visited. This may occur in places where there is a high density of stores (e.g., a mall) or where there is inaccurate geolocation information (e.g., GPS connection was poor, resulting in inaccurate geolocation information). For example, on screen 1300 the inferred event detection system 100 suggests that the location information may also correspond to a particular gas station. The user may select this suggestion of the inferred event detection system 100 if there was an error in the location name initially provided, by selecting the appropriate location name from the popup 1304.

8.0 Additional Features of the Inferred Event Detection System

An embodiment of the inferred event detection system 100 may include the following additional features:

8.1 Missing Time Entry

In an embodiment, the inferred event detection system 100 provides suggestions for an inferred event based on a time of day. The inferred event detection system 100 may search for a qualifying event that it believes will occur at a certain time of day, but did not occur. For example, during a common qualifying location event includes a lunch that may occur anytime between the hours of 12 to 2. However, during a day when a business trip is occurring, the inferred event detection system 100 has not detected a meal event between 12 p.m. to 2 p.m. for a user. Even though the inferred event detection system 100 did not detect an inferred event for that day, the inferred event detection system 100 may note to the user that a lunch expense is common daily and that a lunch expense may have occurred, even though it was not detected as an inferred event.

8.2 Machine Learning

In an embodiment, the inferred event detection system 100 uses machine learning techniques to assist a user to produce their expense report. Some examples of machine learning techniques that may be used with the inferred event detection system 100 comprise:

Recategorization. If users frequently change a particular detail of an inferred event from one to another, the inferred event detection system 100 may determine to change the particular detail to default to the detail frequently selected. As an example, if an inferred event is frequently changed from traveling by taxi to traveling by a personal vehicle, the inferred event detection system 100 can deduce that, when a similar traveling event is detected, it should be properly classified as traveling using a personal vehicle and the qualifying event changed as such.

Special Location. If an inferred event includes geolocation information that corresponds to a special location, the inferred event detection system 100 may automatically categorize the inferred event with particular details based on the geolocation information. For example, if the particular location is an airport, the inferred event detection system 100 may automatically categorize inferred events at that particular location as travel classification, using an airplane.

8.3 Blacklist

In an embodiment, the inferred event detection system 100 may include blacklist information. When criteria specified in the blacklist are met, the inferred event detection system 100 may automatically stop monitoring for inferred events at a mobile computing device. For example, a user may prevent the inferred event detection system 100 from collecting inferred events when they are home by entering their home address to the inferred event detection system 100. As another example, the user may disallow the inferred event detection system 100 to gather information during certain times of a day. For example, if the user's workday always ends at 7 p.m., the user may create in the blacklist a rule to prevent the inferred event detection system 100 from collecting information after 7 p.m. and to automatically resume after 6 a.m.

8.4 Privacy

In an embodiment, the inferred event detection system 100 is programmed to provide a privacy feature. When enabled, the privacy feature allows the inferred event detection system 100 to collect inferred event information, but stores the inferred events locally on the mobile computing device. This prevents unauthorized access to the user's travel history. For example, during specified business hours the device 101 could allow collection by the inferred event detection system 100 of geolocation data for the purposes of generating an expense report. However, during evening hours, the device 101 may turn off the inferred event collection functions of the system 100 or store inferred event information only locally, without a transfer to the server computer, so that before the user submits their expense report and after viewing the wrap up view, the user may remove these inferred events from their history so that they are not submitted as part of the expense report.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
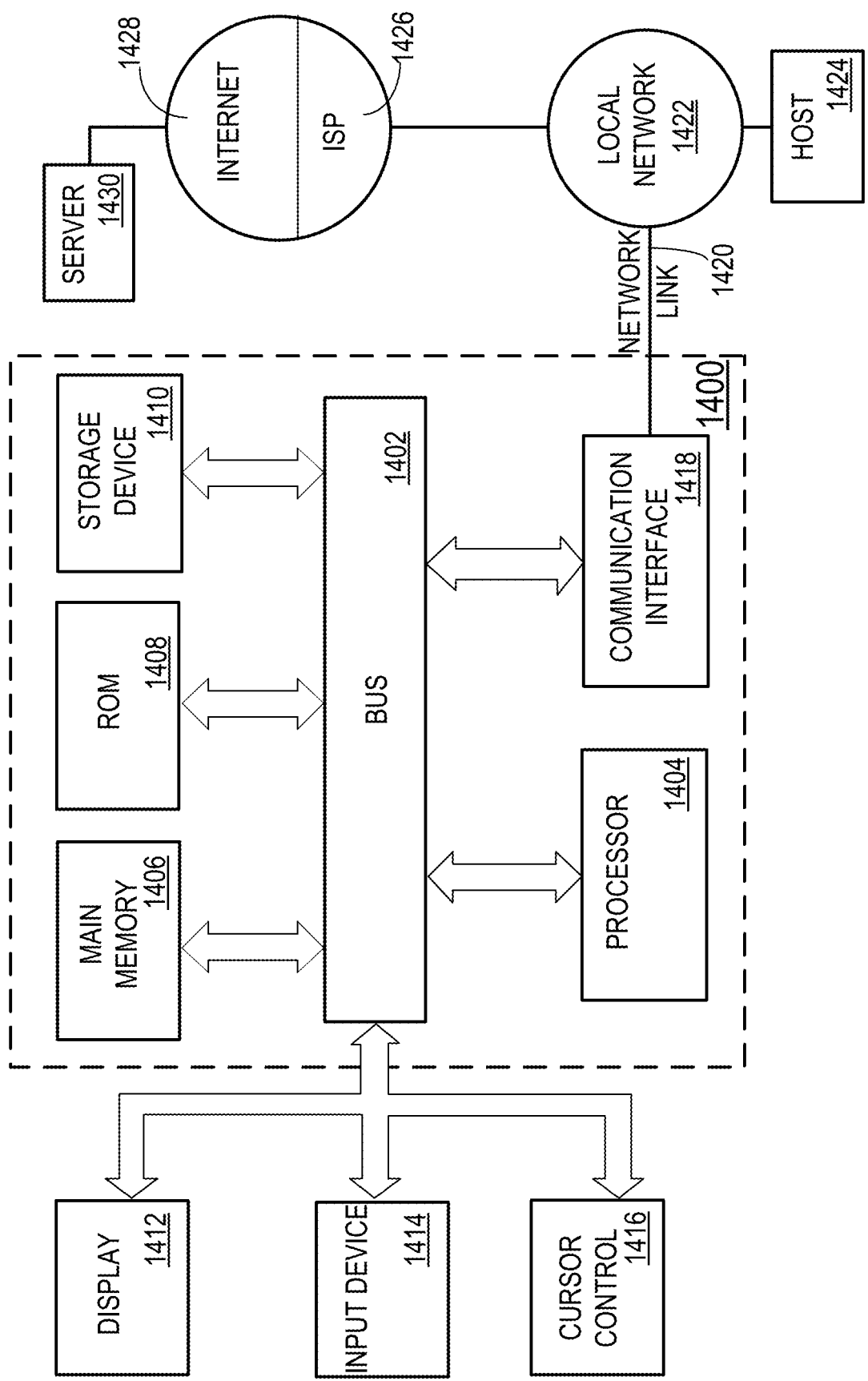
FIG. 14 is a block diagram that illustrates a computer system upon which an embodiment of the invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1460 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using an application on a mobile computing device, wherein the mobile computing device includes at least one geolocation antenna capable of providing geolocation information that is accessible by the application and that specifies a geolocation of the mobile computing device at a particular time, wherein the application comprises data and program instructions that define rules for collecting information during a predefined time period, monitoring the geolocation information to detect a trigger during the predefined time period, the trigger comprising one of the geolocation information corresponding to a location previously associated with a merchant or the mobile computing device traveling;

inferring by the application, one or more events based on the geolocation information corresponding to a location previously associated with a merchant, the inferring comprising:
  determining that one or more of the first timestamp and the second timestamp occurs during the defined workday period;
  determining the geolocation information corresponds to a merchant and
  determining, when the geolocation information for the mobile computing device corresponds to a location associated with a merchant, that a difference between a first timestamp associated with the geolocation information and a second timestamp associated with the geolocation information is greater than a threshold time difference; and inferring, by the application, one or more events based on the mobile computing device traveling, the inferring comprising two or more of:
  determining a magnitude of the change between a first geolocation information at the first timestamp and a second geolocation information at the second timestamp corresponds to the mobile computing device traveling;
  determining one or more of a start point and an end point corresponds to a merchant;
  determining from a data feed that a trip has been scheduled;
  determining a mode of travel from the data feed; and
determining a distance traveled by the mobile computing device associated with the mode of travel;

generating, in response to determining that an event has occurred based on the geolocation information corresponding to a location previously associated with a merchant or based on the mobile computing device traveling, a first alert to be displayed on the mobile computing device, wherein the first alert comprises a notification that the application has detected an inferred event and a prompt for expense information to be associated with the event and one or more of the location, the merchant, the mode of travel and the distance traveled is displayed as a part of the first alert;

storing, in a user account on a computer system, an expense record including information about each event including one or more of the first timestamp, the second timestamp, the difference between the first timestamp and the second timestamp, the first geolocation information, the second geolocation information, the merchant, the distance traveled and any expense information associated with the event that is received in response to the first alert;

wherein the first alert comprises a push notification displayed on a lock screen of the mobile computing device, the push notification responsive to a sequence of two user interactions including a first user interaction to unlock the mobile computing device and a second user interaction to display expense information relating to one or more of the location, the merchant, the mode of travel and the distance traveled.

2. The method of claim 1, wherein the data feed comprises credit card information.

3. The method of claim 1, wherein the expense information about the event includes a location name, the method further comprising:
  causing a query to execute at the computer system to determine the location name corresponding to the first geolocation information or the second geolocation information;
  receiving the location name at the mobile computing device;
  wherein storing expense information about the event further includes the location name.

4. The method of claim 1, further comprising:
  determining that the event corresponds to a first event class;
  retrieving a first template corresponding to the first event class, wherein the first template specifies that a digital representation is required to be associated with events of the first event class;
  after the prompt for the first alert, accessing a digital image capturing component of the mobile computing device by the application;
  receiving a digital representation of an expense asset, captured using the digital image capturing component;
  associating the digital representation of the expense asset with the event in the user account.

5. The method of claim 1, further comprising:
  determining that the event corresponds to a second event class;
  retrieving a second template corresponding to the second event class, wherein the second template specifies that a geographic distance is associated with events of the second event class;
  determining a route taken to travel from the first geolocation information to the second geolocation information;
  calculating a distance traveled based on the route from the first geolocation information and the second geolocation information;
  determining a cost based on the distance and a rate; and
  associating the cost and the distance traveled with the event for the user account.

6. The method of claim 1,
wherein the data feed comprises travel booking information.

7. A method comprising:
using an application on a mobile computing device, wherein the mobile computing device includes at least one geolocation antenna capable of providing geolocation information that is accessible by the application and associating a timestamp with a geolocation of the mobile computing device, wherein the application comprises data and program instructions that define rules for collecting information during a predefined time period of a day;
monitoring the geolocation information to detect a trigger during the predefined time period, the trigger comprising one of the geolocation information corresponding to a location associated with a merchant or a magnitude of a change between a first geolocation information and a second geolocation information corresponding to the mobile computing device traveling;
inferring a set of events, wherein each event corresponds to at least one of a plurality of monitored event classifications for which an expense report should be created at the mobile computing device, comprising:
  determining each event for which the geolocation information for the mobile computing device corresponds to a location of a merchant and that a difference between a first timestamp associated with the geolocation information and a second timestamp associated with the geolocation information is greater than a threshold time difference, determining each event that corresponds to the mobile computing device traveling by determining that the magnitude of a change between the first geolocation information at the first timestamp and the second geolocation information at the second time stamp is greater than a threshold distance difference; and communicating with a computer system comprising a data feed component to determine that one or more of a trip has been scheduled, a mode of travel has been selected or a ticket has been purchased;

storing each inferred event in the mobile computing device; and generating, in response to determining that the inferred event has occurred, an alert to be displayed on the mobile computing device, wherein the alert comprises a notification that the application has detected an inferred event and a prompt for expense information to be associated with the inferred event and one or more of the location, the merchant, the mode of travel and a distance traveled is displayed as a part of the alert;

selecting from a plurality of inferred events stored in the mobile computing device, one or more inferred events to create a filtered set of inferred events;

displaying, on a display of the mobile computing device, an interactive display comprising one or more of:
  a timeline interface element including a plurality of inferred event interface elements, each inferred event interface element representing an inferred event in the filtered set of inferred events in a chronological order;
  a map interface element adjustable according to selecting one or more of the plurality of inferred event interface elements;
  a start/pause button actionable to at least temporarily cause the mobile computing device to stop collecting and displaying additional inferred events;

receiving from the mobile computing device a selected inferred event represented by one or more of the plurality of inferred event interface elements; and storing, in a user account on the computer system, an expense record including information about each event in the set of events including one or more of the first timestamp, the second timestamp, the difference between the first timestamp and the second timestamp, the first geolocation information, the second geolocation information, the merchant, the distance traveled and any expense information associated with the inferred event that is received in response to the alert.

8. The method of claim 7, wherein the selected inferred event comprises a first geolocation information and a second geolocation information and the method further comprises:
  determining a route taken to travel from the first geolocation information to the second geolocation information;
  determining the mode of travel based on the route;
  displaying a visual representation of the route on the map interface element as part of an updated interactive display.

9. The method of claim 8, further comprising;
  calculating a distance traveled based on the route from the first geolocation information and the second geolocation information; and
  determining a cost based on the route and the mode of travel.

10. The method of claim 7, wherein the set of events is collected before displaying on an interactive display.

11. The method of claim 7, further comprising:
  accessing a digital image capturing component of the mobile computing device by the application;
  receiving a digital representation of an expense asset, captured using the digital image capturing component;
  associating the digital representation of the expense asset with an event of the set of events.

12. The method of claim 7, wherein the plurality of inferred event interface elements comprises a plurality of icons arranged according to at least one timestamp of the one or more inferred events represented by the plurality of inferred event interface elements.

13. The method of claim 7, further comprising determining, as part of the one or more inferred events, a first inferred event that shares at least one item of geolocation information with a second inferred event.

14. The method of claim 13, wherein the first inferred event corresponds to a traveling monitored event class and the second inferred event corresponds to a location monitored event class.

15. The method of claim 7, further comprising determining the geolocation information using the at least one geolocation antenna of the mobile computing device.

16. The method of claim 7, further comprising determining by the application, as each inferred event of the one or more inferred events are collected, a corresponding monitored event class based on the at least one timestamp or the at least one geolocation information for said inferred event.

* * * * *